Oct. 29, 1929.  E. H. LORENZ  1,733,547
APPARATUS FOR HANDLING GLASSWARE
Filed Aug. 23, 1926  2 Sheets-Sheet 1
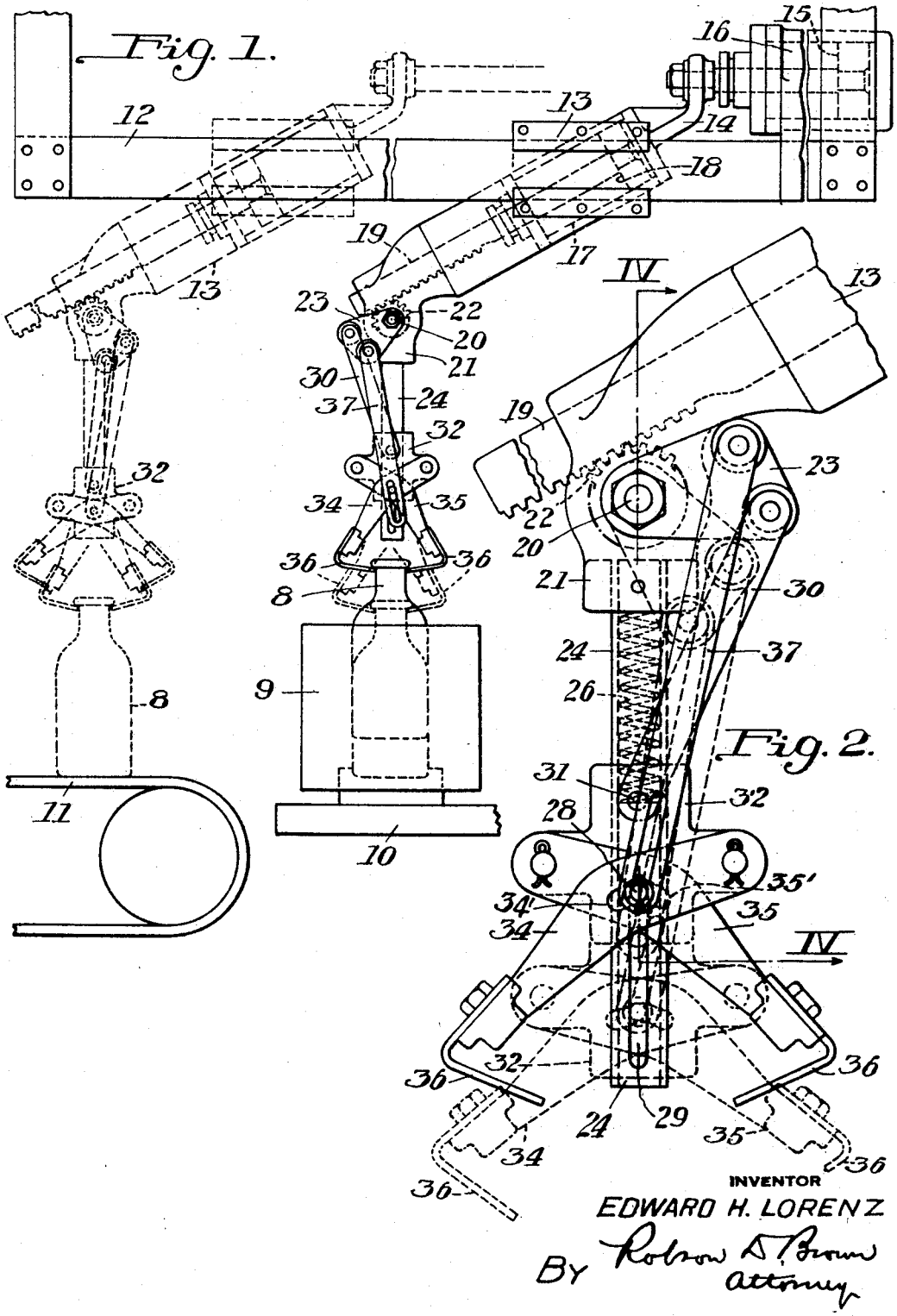
INVENTOR
EDWARD H. LORENZ
By Robson D. Brown
attorney Oct. 29, 1929.　　　E. H. LORENZ　　　1,733,547
APPARATUS FOR HANDLING GLASSWARE
Filed Aug. 23, 1926　　　2 Sheets-Sheet 2
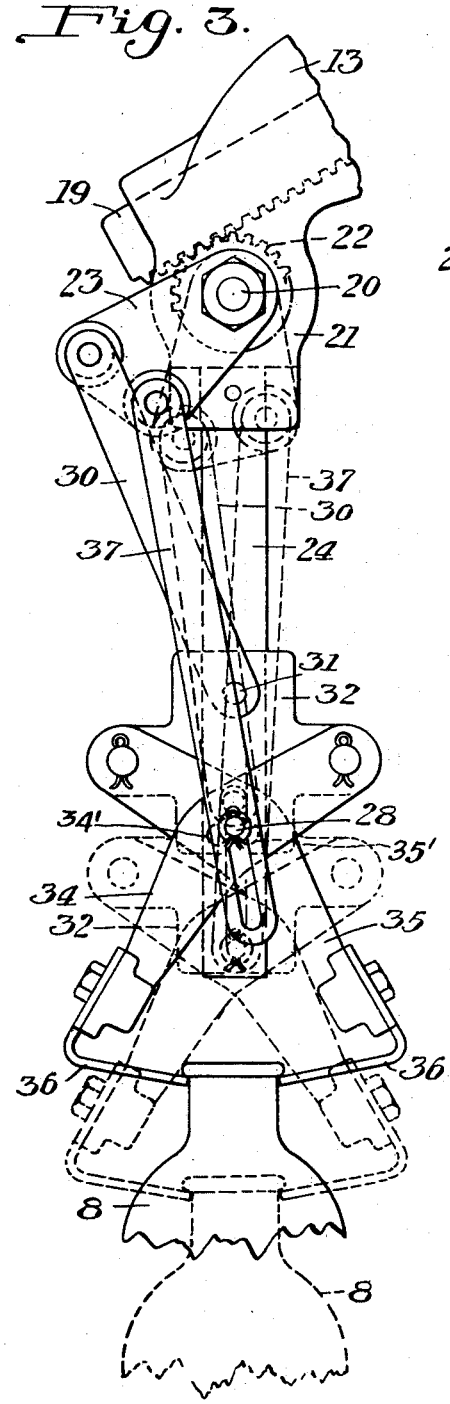
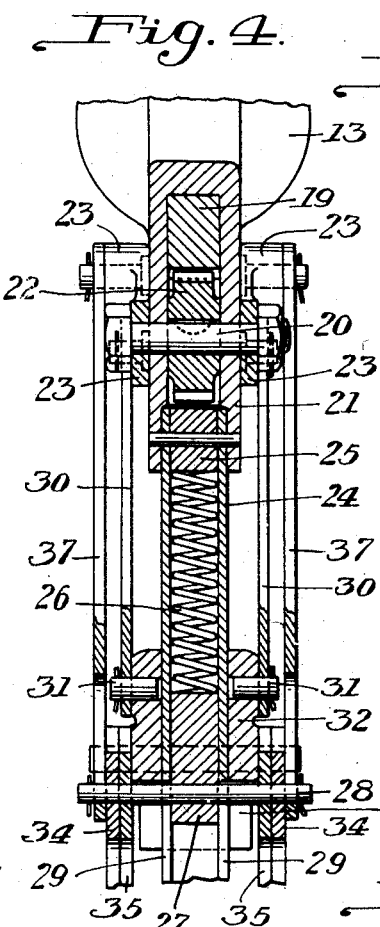
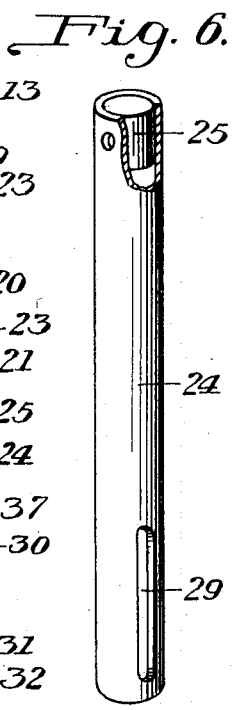
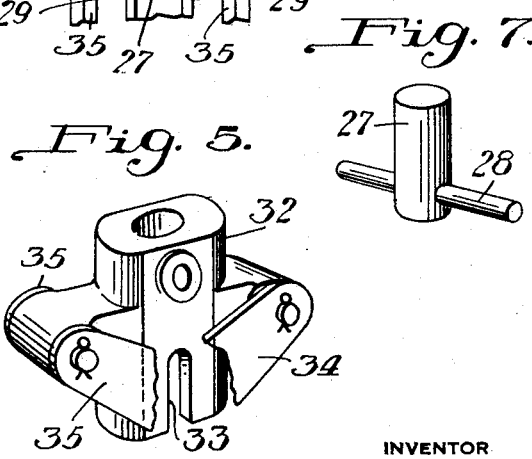
INVENTOR
EDWARD H. LORENZ Patented Oct. 29, 1929

1,733,547

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR HANDLING GLASSWARE

Application filed August 23, 1926. Serial No. 130,792.

My invention relates to apparatus for handling glasware and other articles. It is especially useful for employment as a take-out device for removing glassware from the forming molds to a conveyor, but is also suitable for employment in various other relations.

One object of my invention is to provide an improved form of handling mechanism for transferring glass articles from a mold to a conveyor or other receiving surface, in an upright position.

Another object of my invention is to provide an improved and simplified means for handling and transferring articles of various kinds.

The apparatus comprises means for lifting a bottle or similar article from a mold or other support by a pair of tongs and then carrying the article to a conveyor or other receiver. When the tongs have released the article, they are moved vertically to clear the article and are then returned to a position for transferring another article.

One form of apparatus embodying my invention is shown in the accompanying drawing wherein Figure 1 is a side elevational view; Fig. 2 is a view, on an enlarged scale, of a portion of the apparatus of Fig. 1, but showing the ware-handling tongs in open position; Fig. 3 is a view showing the tongs in the position indicated by full lines in Fig. 1, but on an enlarged scale; Fig. 4 is a view taken on the line IV—IV of Fig. 2; Fig. 5 is a perspective view of the tong-supporting block of the other figures; Fig. 6 is a perspective view, partially broken away, of the guiding sleeve of Fig. 4, and Fig. 7 is a perspective view of the tong-operating plunger of Fig. 4.

The apparatus is shown as employed for removing completed bottles 8 from a forming mold 9, a series of which may be mounted upon a rotatable mold table 10, to a conveyer 11 that may carry the articles into a lehr (not shown). A bar 12 is supported on suitable brackets above the mold table 10 and the conveyer 11, and slidably supports a carriage 13 that is connected through a bar 14 with the piston 15 of a cylinder 16. The piston 15 is reciprocated in the cylinder 16 by fluid pressure admitted alternately to opposite ends of the cylinder, so as to effect movement of the carriage 13 back and forth upon the bar 12, to transfer bottles from the mold table 10 to the conveyor 11.

A cylinder 17 is secured to the carriage 13 and is provided with a piston 18 fixed to a rack bar 19. A shaft 20 is journaled in a depending portion 21 of the carriage 13 and is provided with a pinion 22 which is keyed thereto. A pair of arms 23 are also secured to the shaft 20, so that upon rotation of the shaft they function as cranks.

A guide sleeve 24 is secured to the lower end of the extension 21 and is provided with a spring-seating block 25 against which the upper end of a spring 26 abuts. A plunger 27 is movably supported within the lower portion of the sleeve 24, by means of a pin 28 whose ends extend through slots 29 in the walls of the sleeve. The spring 26 normally tends to hold the plunger 27 in its lowermost position.

The crank arms 23 carry a pair of links 30 that are connected at their lower ends, through pins 31, with a tong head or block 32. The block 32 is centrally perforated and fits over the lower end of the sleeve 24. The lower end of the block is provided with slots 33 in which the ends of the pin 28 may slide. Two pairs of tong arms 34 and 35 are pivotally connected to the block 32, and have ware-gripping jaws 36 secured to their lower ends. The tong arms 34 and 35 are provided with angular slots 34' and 35' respectively through which the pin 28 extends, so that when the plunger 27 is moved in a vertical direction relative to the tong head 32, the tong arms will be oscillated about their pivots. A pair of tong-opening links 37 are pivotally supported by the crank arms 23 and are slotted at their lower ends so as to have lost motion connection with the pin 28.

Assuming that the tongs occupy the position indicated in full lines in Fig. 2, fluid pressure will be admitted to the lower end of the cylinder 17 to effect retractive movement of rack bar 19, thereby moving the crank arms 23 in a clockwise direction and lowering the links 30 and 37. Since the links 30 support the tong head 32, the tongs are moved down to the position indicated in dotted lines (Fig. 2). The point of pivotal connection between the links 30 and the arms 23 has then reached substantially its lower limit. Continued movement of the cranks 23 will cause further downward movement of the links 37, since they are connected to the cranks at a point above and to the rear of the links 30. The lowering of the links 37 permits the spring 26 to move the plunger 27 downwardly and cause the pin 28, which extends through the angular slots of the tongs 34 and 35 to contract the jaws 36 and grasp a bottle neck, as shown in dotted lines in Fig. 3.

Continued movement of the crank arms 23 will elevate the links 30 and 37 to the position shown in full lines in Fig. 3, thus lifting the bottle from the mold or other support. Air pressure may then be admitted to the rear side of the piston 15, to move the carriage 13 along the bar 12 to a point above the conveyer 11, as indicated by dotted lines in Fig. 1, whereupon fluid pressure is admitted to the upper side of the piston 18 to effect movement of the cranks 23 in a counter-clockwise direction. During the first period of this movement, the upper ends of the links 37 are moved in a substantially horizontal direction, from the position indicated in full lines in Fig. 3 to that indicated in dotted lines, the lower ends having little movement with respect to the head 32, but the links 30 are moved in a generally vertical direction, to lower the tong head 32 toward the conveyer.

Further counter-clockwise movement of the cranks 23 will at first elevate the links 37 and move the links 30 in a substantially horizontal direction. The elevation of the links 30 results in the taking-up of lost motion between them and the pin 28, and thereafter drawing the plunger 27 upwardly against the tension of the spring 26 and forcing the tongs open. At this stage, the parts occupy substantially the positions indicated in dotted lines in Fig. 2. Further counter-clockwise movement of the cranks 23 will cause the links 30 to elevate the tong head 32, so that the tongs will be lifted above the bottle that has been deposited upon the conveyer 11. Air may then be admitted to the forward side of piston 15 to return the carriage to the position above the mold table 10, preparatory to the beginning of another cycle of operations.

Fluid pressure will be admitted to the cylinders 16 and 17 in properly timed relation, through suitable valve mechanism (not shown), so that the tongs will be actuated to engage and lift a bottle when the piston 15 is at its extreme right-hand position, and to deposit the bottle upon the conveyer when the piston 15 is in its left hand position.

It will be observed that this apparatus provides for lowering, raising and opening or closing the tongs through one movement of a single actuator, namely, the rack 19. Thus, when the rack 19 is moved at the receiving station shown in full lines in Fig. 1, the single stroke of the rack causes the tongs to be lowered, closed about the bottle neck, and then raised; while the single opposite stroke of the rack at the releasing station causes the tongs to be lowered, opened and raised. Such operation of the tongs by a single actuator is one of the novel characteristics of this invention.

While the apparatus illustrated in the drawings and described in the specification is shown as a takeout device for removing bottles from a forming machine to a conveyer, it is obviously of equal utility as a transfer for bottles from any two bottle supports. Therefore, in the specification and claims in which the terms "takeout" and "takeout apparatus" are used, these terms are, unless otherwise limited by the context, to be construed as including any transfer mechanism.

I claim as my invention:

1. Take-out apparatus for removing glassware from molds, comprising ware-gripping tongs, means for imparting traveling movement to said tongs in a horizontal direction, mechanical means for raising and lowering the tongs at each end of their path of travel, and means controlled by the raising and lowering means, for closing said tongs when in their lower position at one end of the said path of movement, and for opening the tongs when in their lowermost position at the other end of the path of movement.

2. Apparatus for handling ware, comprising a carrier, a crank pivotally mounted on said carrier, a pair of links connected to said crank at points spaced circumferentially of the axis thereof, a tong support connected to one of said links, a pair of tongs pivotally connected to said support, a member movable to actuate said tongs, and a lost-motion connection between the other link and said member, whereby said tongs will be moved about their pivots when the first named link has been moved to a predetermined position.

3. Apparatus for handling ware, comprising a crank, means for oscillating said crank, a pair of links connected to said crank at points spaced circumferentially of its axis, a support connected to one of said links, a gripping member pivotally connected to said support, and a lost-motion connection between the other link and said gripping member, whereby the gripping member will be actuated when said crank reaches a predetermined point in its path of travel.

4. Apparatus for handling ware, comprising a carriage, a guide member suspended from said carriage, a block having slidable engagement with said member, a gripping member pivotally connected to said block, a crank rotatably mounted on said carriage, a link carried by said crank and connected to said block, a second link connected to said crank at a point spaced circumferentially of the point of connection of the first named link thereto, and a lost-motion connection between the second named link and said gripping member, whereby the said gripping member is actuated at predetermined positions of the block upon the guide member.

5. Apparatus for handling ware, comprising a support, a guide member connected to said suport, a block having slidable engagement with said member, a gripping member pivotally connected to said block and bodily movable therewith with respect to said support, means for moving said block longitudinally of the guide member, and a lost motion connection between said gripping member and said support, whereby the gripping member is actuated when it reaches a predetermined point.

6. Apparatus for handling ware, comprising a support, a guide member connected to said support, a block slidably carried by said member, a gripping member pivotally connected to said block, a plunger carried by said guide member and loosely connected to the gripping member, a spring normally holding the plunger in one extreme position of movement, means for moving said block longitudinally of the guide member, and a lost motion connection between said support and the plunger for limiting expansive movement of the plunger.

7. Apparatus for handling ware, comprising a support, a sleeve secured to said support, a block slidably carried by said sleeve, a pair of gripping members pivotally connected to said block, a plunger carried by said sleeve and loosely connected to said gripping members, a spring for holding said plunger in one extreme position of movement, a crank journaled in said support, a link connecting said crank and said block, and a lost motion connection between said support and said plunger for limiting movement of the plunger in one direction.

8. Apparatus for handling ware, comprising ware-gripping tongs and unitary means adapted to lower said tongs at a ware-gripping station, to close said tongs and to raise said tongs, the same unitary means being adapted to thereafter lower said tongs, open said tongs, and raise said tongs while open, to leave the ware at a releasing station.

9. Apparatus for handling ware comprising ware gripping tongs, mechanical means for raising and lowering said tongs, and means responsive to the first named means for opening and closing said tongs, the whole being so constructed and arranged that the tongs may be maintained either open or closed in raised position.

10. Apparatus for handling ware comprising ware gripping tongs, mechanical means for raising and lowering said tongs, means responsive to the first named means for opening and closing said tongs, and means for moving said tongs in a lateral direction in raised position while either open or closed.

11. Apparatus for handling ware comprising ware gripping tongs, a crank, means to actuate said crank, and interconnecting means between said crank and said tongs so arranged that in both terminal positions of said crank said tongs are in raised position, and movement of said crank from one terminal position to the other respectively opens and closes said tongs.

12. Apparatus for handling ware comprising ware gripping tongs, a crank, means to actuate said crank, and interconnecting means between said crank and said tongs so arranged that in one terminal position of said crank, said tongs are open in raised position; movement of the crank to an intermediate position lowers and closes the tongs, and movement of the crank from said intermediate position to the other terminal position again raises the tongs in closed position.

13. Apparatus for handling ware comprising ware gripping tongs, a crank, means to actuate said crank, interconnecting means between said crank and said tongs so arranged that in both terminal positions of said crank said tongs are in raised position, and movement of said crank from one terminal position to the other respectively opens and closes said tongs, and independent means for moving said tongs in a lateral direction.

14. Apparatus for handling ware comprising ware gripping tongs, a crank, means to actuate said crank, interconnecting means between said crank and said tongs so arranged that in one terminal position of said crank, said tongs are open in raised position; movement of the crank to an intermediate position lowers and closes said tongs, and movement of the crank from said intermediate position to the other terminal position again raises with the tongs in closed position, and independent means for moving said tongs in a lateral direction.

Signed at Hartford, Conn., this 21st day of August, 1926.

EDWARD H. LORENZ.